US011850797B2

(12) United States Patent
Bruggeman et al.

(10) Patent No.: US 11,850,797 B2
(45) Date of Patent: Dec. 26, 2023

(54) LIQUEFIER TUBE FOR AN ADDITIVE MANUFACTURING SYSTEM

(71) Applicant: BOND HIGH PERFORMANCE 3D TECHNOLOGY B.V., Enschede (NL)

(72) Inventors: Adrianus Bruggeman, Enschede (NL); Marald Speelman, Enschede (NL); Klaas Groen, Enschede (NL); Martijn Johannes Wolbers, Enschede (NL); Koendert Hendrik Kuit, Enschede (NL); Antonie Everhard Ekkelenkamp, Enschede (NL)

(73) Assignee: BOND HIGH PERFORMANCE 3D TECHNOLOGY B.V., Enschede (NL)

( * ) Notice: Subject to any disclaimer, the term of this patent is extended or adjusted under 35 U.S.C. 154(b) by 288 days.

(21) Appl. No.: 17/281,376

(22) PCT Filed: Oct. 2, 2019

(86) PCT No.: PCT/EP2019/076751
§ 371 (c)(1),
(2) Date: Mar. 30, 2021

(87) PCT Pub. No.: WO2020/070212
PCT Pub. Date: Apr. 9, 2020

(65) Prior Publication Data
US 2022/0032541 A1  Feb. 3, 2022

(30) Foreign Application Priority Data

Oct. 3, 2018  (EP) .................................... 18198461
Oct. 3, 2018  (EP) .................................... 18198464

(51) Int. Cl.
*B29C 64/209*  (2017.01)
*B33Y 30/00*  (2015.01)
(Continued)

(52) U.S. Cl.
CPC ............ *B29C 64/209* (2017.08); *B29C 48/02* (2019.02); *B29C 48/05* (2019.02);
(Continued)

(58) Field of Classification Search
CPC ... B29C 64/209; B29C 48/3001; B29C 48/92; B29C 48/02; B29C 48/05; B33Y 30/00; C25D 1/02
(Continued)

(56) References Cited

U.S. PATENT DOCUMENTS

2017/0274575 A1  9/2017  Meshorer et al.
2018/0243962 A1*  8/2018  Luttmann ............... B29C 48/34

FOREIGN PATENT DOCUMENTS

CN    107953558 A  *  4/2018  ............ B33Y 30/00
CN    207746417 U  *  8/2018  ............ B22F 3/003
(Continued)

OTHER PUBLICATIONS

CN107953558A, Unannounced Inventor, Changsha Yuandahue Information Tech Co Ltd, published Apr. 24, 2018. (Year: 2018).*
(Continued)

*Primary Examiner* — Nahida Sultana
*Assistant Examiner* — Lawrence D. Hohenbrink, Jr.
(74) *Attorney, Agent, or Firm* — Hudak, Shunk & Farine Co. LPA (57) ABSTRACT

A liquefier tube for an additive manufacturing system, the liquefier tube including a body provided with a feed channel including a feeding portion having a first diameter, an outlet portion having a second diameter, the first diameter being larger than the second diameter, a transitional portion interconnecting the feeding portion and the outlet portion. The transitional portion has a monotonically decreasing third diameter from the feeding portion to the outlet portion and the third diameter as function of a longitudinal position of
(Continued)

the feed channel in the transitional portion between the feeding portion and the outlet portion and at a transition between the transitional portion and the outlet portion is differentiable. Methods of manufacturing the liquefier tube.

21 Claims, 5 Drawing Sheets

(51) Int. Cl.
    *B29C 48/30* (2019.01)
    *B29C 48/92* (2019.01)
    *B29C 48/02* (2019.01)
    *B29C 48/05* (2019.01)
    *C25D 1/02* (2006.01)

(52) U.S. Cl.
    CPC .......... *B29C 48/3001* (2019.02); *B29C 48/92* (2019.02); *B33Y 30/00* (2014.12); *C25D 1/02* (2013.01)

(58) Field of Classification Search
    USPC ........................................................ 264/308
    See application file for complete search history.

(56) References Cited

FOREIGN PATENT DOCUMENTS

| | | |
|---|---|---|
| CN | 207746417 U | 8/2018 |
| EP | 0193678 A1 | 9/1986 |
| EP | 0467680 A1 | 1/1992 |
| KR | 101781601 B1 | 9/2017 |
| WO | 2017082934 A1 | 5/2017 |

OTHER PUBLICATIONS

Li et al., CN 207746417U, Aug. 21, 2018, machine translation to English. (Year: 2018).*

* cited by examiner

LIQUEFIER TUBE FOR AN ADDITIVE MANUFACTURING SYSTEM

FIELD OF THE INVENTION

The invention relates to a liquefier tube for an additive manufacturing (AM) system. The invention further relates to methods of manufacturing the liquefier tube.

BACKGROUND OF THE INVENTION

Liquefier tubes in AM systems are used to melt AM feedstock material to allow the feedstock material to be deposited in layers to manufacture three-dimensional (3D) objects to be created in accordance to electronic models which are used in the AM systems. AM feedstock material can comprise polymers which be advantageously used in AM systems for 3D modeling objects.

Liquefier tubes can be attached to a three-dimensionally movable platform, also known in the art as printhead assembly, which may be further equipped with a supply of AM feedstock material and heaters to heat the liquefier tube to obtain a temperature appropriate for dispensing the AM material for depositing on the 3D object. The printhead assembly can be moved relative to the object in space to be created using a gantry. Drives and a controller allow the gantry to move the printhead assembly and the AM feedstock material supply to deposit the AM feedstock material and create the 3D object.

The liquefier tube has a liquefier body provided with a feed channel, wherein the feed channel has a feeding portion, an outlet portion and a transitional portion interconnecting the feeding portion and the outlet portion. The feeding portion interfaces with the AM feedstock supply. The outlet portion, in the art also referred to as nozzle, has an orifice from which the molten AM feedstock material is dispensed. In the art, the entire liquefier tube may sometimes also be referred to as nozzle.

The feeding portion and outlet portion usually have different diameters. The transitional portion interfaces the outlet portion to the feeding portion. The liquefier tube is usually arranged near heaters which can heat up the liquefier tube to allow the AM feedstock material in the feed channel to melt. The melting can be performed at high temperature in the transitional portion to have a minimal amount of molten AM feedstock material. Dimensions of the transitional portion can be chosen to minimize residence time of the AM feedstock material to prevent degradation or even decomposition of the material.

In the art, liquefier tubes and the feed channels therein can be produced by machining, e.g. turning and milling and welding a metal liquefier body. A consequence of this production method can be that the internal shape of a nozzle is non-fluent and that the surface of the liquefier tube has a certain roughness. This production method may limit the types of shapes of the feed channel that can be produced. As flow lines of the main stream of the AM feedstock material within the feed channel tend to be fluent, dead spots in the flow occur in the parts removed from the main flow.

Such dead spots may occur at transitions from the feeding portion to the transitional portion, and from the transitional portion to the outlet portion. Moreover, roughness of the inner surface of the feed channel, especially in the transitional portion, may lead to extended residence time of the AM feedstock material. In such dead spots, residence time of the AM feedstock material may be too long, leading to decomposition of the AM feedstock material.

This decomposition may lead for certain polymers to charring and clotting and thereby formation of particles which may clog the outlet portion of the liquefier tube and contaminate the feedstock material deposited on the object to be created using AM. This is especially troublesome for AM systems which are arranged for high precision. Such AM systems have liquefier tubes which can be provided with narrow high precision orifices and are therefore more prone to clogging by particles in the AM feedstock material.

Furthermore, charring, clotting and particle forming may be troublesome while applying high performance AM feedstock materials. Even when such decomposed materials pass through the orifice and are deposited on the 3D object to be created, such particles may degrade material characteristics and performance and lead to rejection of the 3D object after completion of the 3D printing process.

SUMMARY OF THE INVENTION

It is therefore an object of the invention to overcome said problems and disadvantages. The object is achieved in a liquefier tube for an additive manufacturing (AM) system.

The liquefier tube according to the invention, comprises a body provided with a feed channel, wherein said feed channel has a feeding portion having a first diameter, an outlet portion having a second diameter, wherein the first diameter is larger than the second diameter, a transitional portion interconnecting the feeding portion and the outlet portion. Said transitional portion has a monotonically decreasing third diameter from said feeding portion to said outlet portion and said third diameter, as a function of a longitudinal position of said feed channel, is differentiable in said transitional portion and at a first transition between said transitional portion and said outlet portion.

The feed channel structured this way is smooth from the transitional portion to the outlet portion. The resulting gradual gradient of the feed channel inner surface allows smooth flow of AM feedstock material with minimal residence time in the transitional portion and thereby prevents formation of dead spots. The liquefier tube with these features can in use be heated at the transitional portion and outlet portion up to or above melting temperature of the AM feedstock material. The gradual gradient prevents deterioration, decomposition and charring of the AM feedstock material. Thus, clogging of the outlet portion is prevented, as well as contamination of the feedstock material deposited on the object to be created.

In an embodiment, said transitional portion has a cone shaped section connected to said feeding portion at a transition between said feeding portion and said transitional portion. When in use, the supply of AM feedstock material is controlled such that a phase transition between solid AM feedstock material and liquid AM feedstock material is below the transition between feeding portion and transitional portion of the feed channel, a non-differentiable transition between said feeding portion and said transitional portion is allowable. An advantage is that a liquefier tube according to this embodiment is less critical to manufacture.

A further advantage of this embodiment is that the first diameter of the feeding portion can be larger than a diameter of the solid AM feedstock material, i.e. the solid AM feedstock material dimensions are less critical. Heat transfer instantly is improved when the solid AM feedstock material touches the cone shaped section and melting occurs at that instant.

In an embodiment, said third diameter as a function of a longitudinal position of said feed channel in said transitional portion is differentiable at a second transition between said feeding portion and said transitional portion.

This causes the entire route from feeding portion to outlet portion to have a gradual gradient, along which no dead spots are present. An advantage of this is that in use, the location of the phase transition between solid AM feedstock material and liquid AM feedstock material can be less critical and may be better controllable relative to the application of a cone shaped section of the transitional portion. This allows more tolerance for dynamic changes of the print speed.

In an embodiment, said third diameter as a function of the longitudinal position of said feed channel in said transitional portion has an S-shaped profile.

In an embodiment, the liquefier tube further comprises a thermal barrier within said body at a same level as said transition between said feeding portion and said transitional portion. This allows a clear phase transition between the solid and liquid phase of the AM feedstock material. In liquefiers tubes the amount of liquid AM feedstock material is kept as small as possible. Thermal separation by the thermal barrier helps minimize the amount of liquid AM feedstock material and prevents thermal crosstalk between the feeding portion and the transitional portion.

In an embodiment, at least one of said feeding portion and said outlet portion has a circular cross section.

In an embodiment, said feed channel has an inner surface with a roughness (Ra) of less than 3.2 µm, preferably less than 0.4 µm, more preferably less than 0.1 µm.

A low Ra enhances smoothness of the inner surface of the feed channel and thereby prevents the molten feedstock material to stick to the surface of the feed channel in the transitional portion. As a consequence, the liquefier tube is less prone to degradation, and time to service and/or lifetime can be extended.

In an embodiment, an inner surface of said transitional portion is provided with a plurality of ribs.

The transitional portion is the portion wherein the molten AM feedstock material is held prior to depositing on the object to be created. Ribs within the transitional portion allow enhanced heat exchange between the inner surface of the feed channel and the AM feedstock material. Consequently, an amount or volume of AM feedstock material in the transitional portion can be reduced.

In an embodiment, the ribs of said plurality of ribs are arranged at least partially longitudinally in a first section of said transitional portion and/or at least partially spirally in a second section of said transitional portion.

Longitudinal orientation of the ribs allows faster flow of AM feedstock material to the outlet portion. Spirally oriented ribs allow more intensive heat exchange between the feed channel surface at the transitional portion and the AM feedstock material.

In an embodiment, the ribs of said plurality of ribs have a differentiable cross-sectional profile.

This prevents formation of dead spots at the grooves between the ribs, and thereby prevents clotting and charring.

In an embodiment, the ribs of said plurality of ribs have a differentiable profile as a function of a longitudinal position within the feed channel.

The ribs are thus formed smoothly without angles relative to the transitional portion inner surface. This further prevents formation of dead spots at the beginning and end of each of the ribs in a longitudinal direction, and thereby prevent clotting and charring.

In an embodiment, the ribs of said plurality of ribs are spaced evenly around said central axis of said transitional portion.

This provides a balanced AM feedstock material flow through a cross section of the transitional portion having ribs.

In an embodiment, said transitional portion is provided with at least one distribution element at a supporting location.

In an embodiment, said at least one distribution element is supported by ribs of said plurality of ribs has a diameter that is larger than a maximum radial distance between opposing ribs of said plurality of ribs at said supporting location.

The at least one distribution element may be spherical which allows even or homogeneous distribution of AM feedstock material along its outer surface.

Alternatively, at least one the distribution element may be non-spherical which allows uneven or non-homogeneous distribution of the AM feedstock within the transitional portion of the feed channel.

In use, the distribution element thus placed in the main flow of the molten AM feedstock material distributes the AM feedstock material to the grooves between the ribs, thereby significantly increasing heat exchange between the AM feedstock material and the transitional portion surface. Thus, melting of the AM feedstock material can be performed more efficiently. The melting can be performed in a smaller volume of the transitional portion, thereby reducing AM feedstock material residence time at melting temperature.

In an embodiment, said at least one distribution element comprises a heat conductive material.

This way the distribution element not only distributes the molten feedstock material, but also distributes the heat within the transitional portion. Thereby the melting of the AM feedstock material is performed significantly more efficient and uniformly.

The object is further achieved in a method of manufacturing a liquefier tube according to the invention. The method comprises a. providing a mandrel having an outer surface that is provided with an outer profile that is complementary to an inner profile of said feed channel of said liquefier tube and wherein said outer surface is electrically conductive;

b. depositing a metal layer on said electrically conductive cover layer for forming said liquefier tube using electroforming;

c. removing said liquefier tube from the mandrel.

Electroforming advantageously allows accurate manufacture of the liquefier tube, as described above, wherein the feed channel has a monotonically decreasing third diameter from said feeding portion to said outlet portion and said third diameter as function of a longitudinal position of said feed channel in said transitional portion between said feeding portion and said outlet portion and at a transition between said transitional portion and said outlet portion is differentiable, i.e. in the profile can have a gradual gradient.

Moreover, the inner surface of the feed channel resulting from the method can be as smooth as the outer surface of the mandrel. No post-processing such as machining or polishing is required for the feed channel inner surface, The object is further achieved in an alternative method of manufacturing a liquefier tube according to the invention. The method comprises a. providing a machining tool having an outer surface profile complementary to an inner surface profile of said feed channel of said liquefier tube, and wherein said outer surface is electrically conductive;
b. providing a metal body for accommodating said feed channel of said liquefier tube;
c. performing at least one of electrochemically machining (ECM) and electrically discharge machining (EDM) on said metal body to form said feed channel within said metal body using said machining tool.

ECM and EDM advantageously allow accurate manufacture of the liquefier tube, as described above, wherein the feed channel profile has a monotonically decreasing third diameter from said feeding portion to said outlet portion and said third diameter as function of a longitudinal position of said feed channel in said transitional portion between said feeding portion and said outlet portion and at a transition between said transitional portion and said outlet portion is differentiable, i.e. in the profile can have a gradual gradient. Moreover, the inner surface of the feed channel can be smooth, as smooth as the machining tool outer surface is made. No post-processing such as further machining or polishing is required for the feed channel inner surface.

BRIEF DESCRIPTION OF THE DRAWINGS

Further features and advantages of the invention will become apparent from the description of the invention by way of exemplary and non-limiting embodiments of a liquefier tube according to the invention.

The person skilled in the art will appreciate that the described embodiments of the liquefier tube are exemplary in nature only and not to be construed as limiting the scope of protection in any way. The person skilled in the art will realize that alternatives and equivalent embodiments of the liquefier tube can be conceived and reduced to practice without departing from the scope of protection of the present invention.

Reference will be made to the figures on the accompanying drawing sheets. The figures are schematic in nature and therefore not necessarily drawn to scale. Furthermore, equal reference numerals denote equal or similar parts. On the attached drawing sheets, FIG. 3b shows a cross section view of the liquefier tube according to FIG. 3a.

DETAILED DESCRIPTION OF EMBODIMENTS

Embodiments of the invention will be elucidated in the description below with reference to the drawings.

Figure 1:
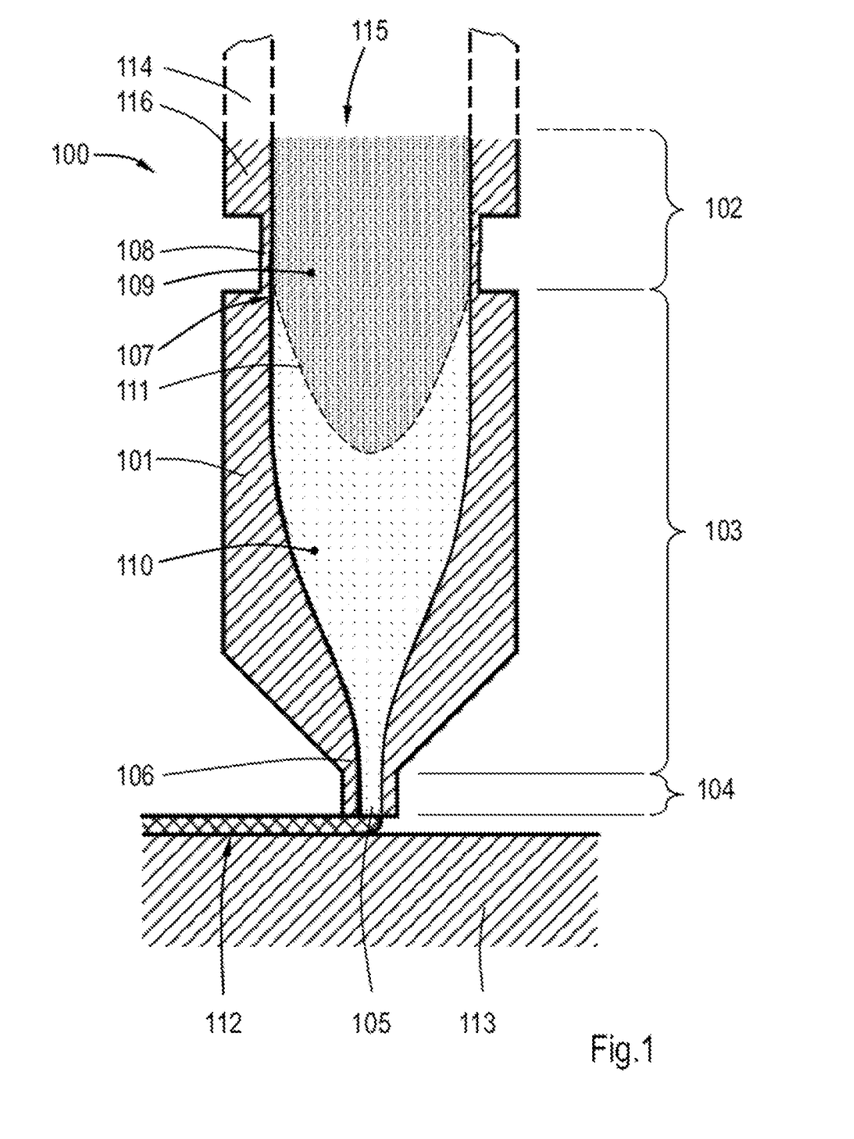
FIG. 1 shows a longitudinal cross section view of a liquefier tube according to an embodiment of the invention.

In FIG. 1 a liquefier tube 100 is shown having a liquefier body 101, wherein a feed channel 115 is created for feeding initially solid AM feedstock material 109, and molten AM feedstock material 110 towards an orifice 105. The feed channel 115 can be formed as a tubular passage through the liquefier body 101. The liquefier body 101 is preferably manufactured from a heat conductive material, such as a metal, and can be mounted in a heating system to melt the supplied solid AM feedstock material 109 into molten AM feedstock material 110. The phase transition between solid AM feedstock material 109 and molten AM feedstock material 110 is represented by dashed line 111. The molten AM feedstock material 110 can exit through orifice 105 of the feed channel 115. The liquefier tube 100 is preferably manufactured in one piece.

By three-dimensionally moving the liquefier tube 100 and simultaneously supplying the solid AM feedstock material 109 to the orifice 105, molten AM feedstock material 110 can be deposited in tracks 112 onto an object 113 to be printed using 3D printing methods. In such methods the tracks form layers which ultimately constitute the object. After the deposition of the tracks 112, the AM feedstock deposited from the orifice 105 fuses with the previously deposited tracks and layers of the object 113 to be printed and solidifies.

The feed channel 115 has a feeding portion 102, a transitional portion 103, connected to the feeding portion 102, and an outlet portion 104 connected to the transitional portion. The feeding portion 102 may be extended of may be connected to an extension 114 such as an AM feedstock supply or tube via an optional rim 116 or may be integrated with the AM feedstock supply. The feeding portion 102 may have any length from zero to a length suitable for interfacing with a preheating zone of the heating system (not shown or further explained in this application). The feeding portion 102 may be cylindrically shaped and may have a first diameter d1, which is further elaborated in FIG. 2.

The transitional portion 103 connects to the feeding portion 102 with preferably a smooth transition 107 between the feeding portion 102 and transitional portion 103 with a differentiable diameter as a function of a longitudinal position within the feed channel 115. The feeding portion 102 may be provided with a thermal barrier 108, to allow the feeding portion 102 and the transitional portion 103 to have different temperatures. The feeding portion 102 close to the thermal barrier 108 may for example have a glass temperature of the AM feedstock material, whereas the transitional portion 103 has a temperature equal to or above a melting temperature of the AM feedstock material.

The thermal barrier 108 may be constituted by a circumferential groove in the liquefier body 101 as shown in FIG. 1, or by an intermediate section of a thermally low conductive material or insulating material.

Figure 2:
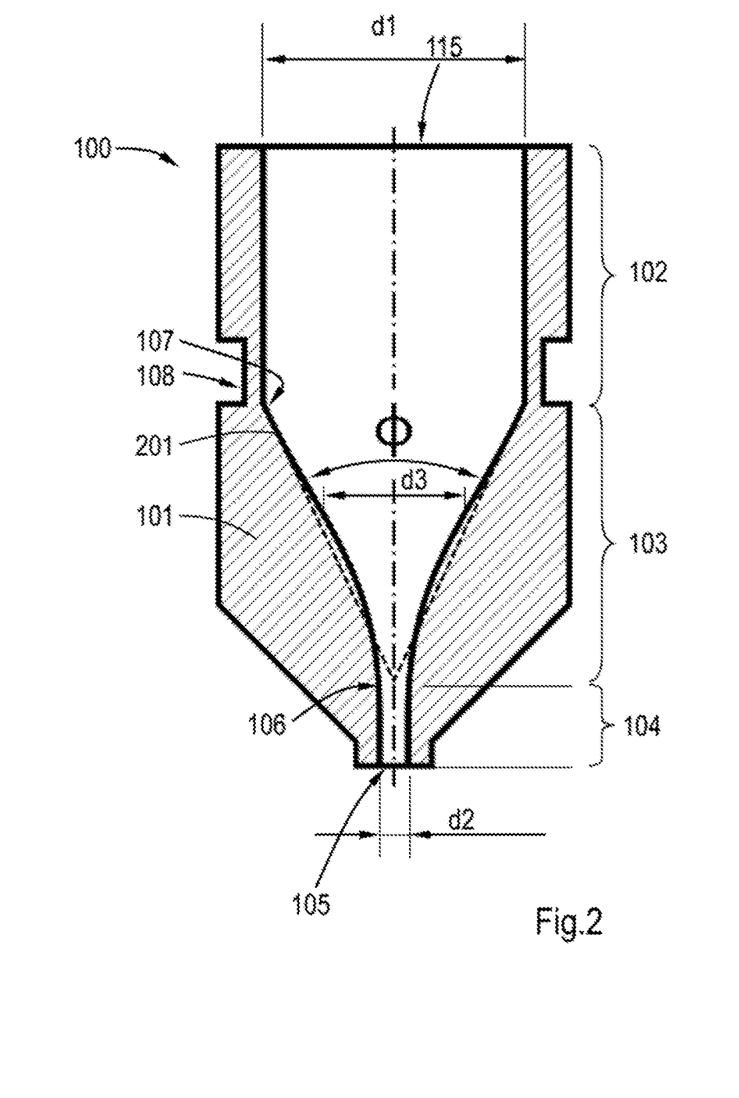
FIG. 2 shows a longitudinal cross section view of a liquefier tube according to an embodiment of the invention.

The transitional portion 103 has a narrowing diameter d3 towards outlet portion 104 of the feed channel 115, which is further elaborated in relation to FIG. 2. The outlet portion 104 ultimately leads the feed channel 115 to orifice 105. The outlet portion 104 starts from transition 106 in the feed channel 115.

The outlet portion 104 may have a constant diameter. The transition 106 between transitional portion 103 and outlet portion is smooth, with a differentiable diameter as a function of a longitudinal position within the feed channel.

The outlet portion 104 may be cylindrically shaped and may have a diameter d2, which is further elaborated in FIG. 2.

In FIG. 2 the feeding portion 102 is shown having diameter d1. The transitional portion 103 has a varying diameter d3, and the outlet portion 104 has a diameter d2. The feed channel 115 from the transition 107 up to the orifice 105 has an inner surface profile throughout the transitional portion 103 of which the diameter is d3 (see FIG. 2) and the outlet portion 104 of which the diameter is d2 is differentiable as a function of a longitudinal position within the feed channel, as seen from a central axis depicted by the dot dashed line from the transition 107 up to the orifice 105.

Alternatively, the preferred embodiment of FIG. 1, the transition 107 between the feeding portion 102 and the transitional portion 103 can have an angle. The transitional portion 103 of the feed channel as shown in FIG. 2 has a cone shaped section 201. This cone shaped section 201 has an opening angle φ.

In FIG. 1 the feed channel diameter d1-d3 is differentiable as a function of a longitudinal position within the feed channel, from the feeding portion 102 up to the orifice 105.

Figure 3A:
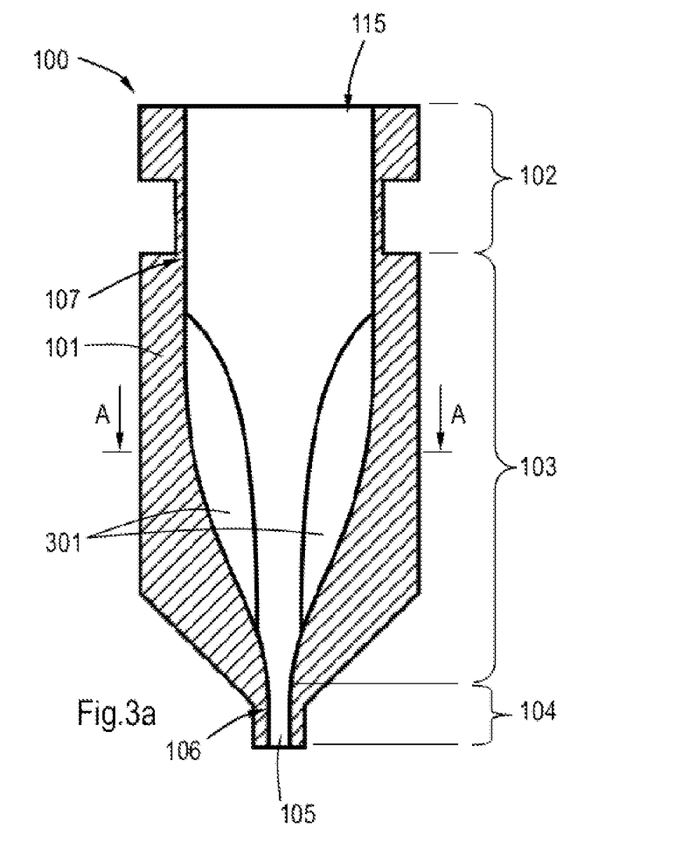
FIG. 3a shows a longitudinal cross section view of a liquefier tube according to an embodiment of the invention.

In FIG. 3a the liquefier tube 100 is shown having a corrugated inner surface, wherein ribs 301 are disposed within the feed channel 115. Preferably the ribs 301 are accommodated within the transitional portion 103, wherein in use the melting of the AM feedstock material is performed. The ribs 301 can be made from the same heat conductive material and engage the AM feedstock material from aside when pushed through the feed channel 115. The ribs 301 increase the inner surface of the transitional portion 103 and thereby improve heat transfer between the liquefier tube 100 and the AM feedstock material. The ribs 301 may have various profiles in longitudinal direction. Preferably the ribs 301 are one with the transitional portion 103. In FIG. 3a the beginning and end of the ribs 301 have an angle relative to the transitional portion inner surface. It may be envisaged by the skilled person to apply smoothed angles to avoid dead spots.

Figure 3B:
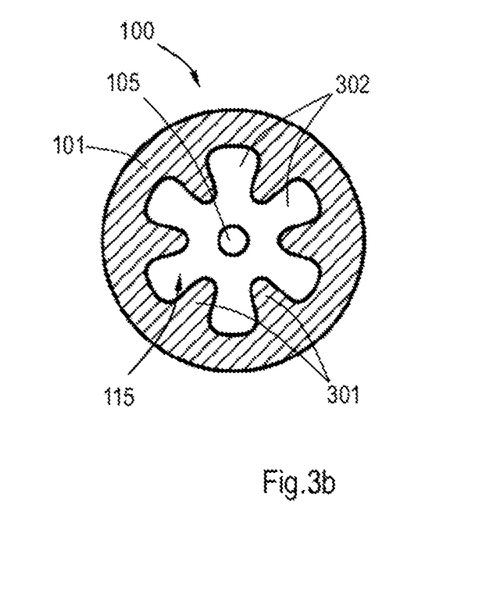

In FIG. 3b a cross section view is shown of the liquefier tube of FIG. 3a at line A-A. In the center, orifice 105 is visible. The ribs 301 can be arranged within the transitional portion 103 evenly spaced circumferentially across a cross section thereof. The ribs 301 may be arranged at least partially spirally, or at least partially longitudinally within the transitional portion 103. As shown in the example of FIG. 3b, the ribs are longitudinally arranged in the transitional portion 103.

In use, the molten AM feedstock material 110 is pressed into the grooves 302 separating the ribs 301. As shown in FIG. 3b, the ribs 301 may have a smooth differentiable corrugated profile across its cross section, to avoid formation of dead spots.

Figure 4:
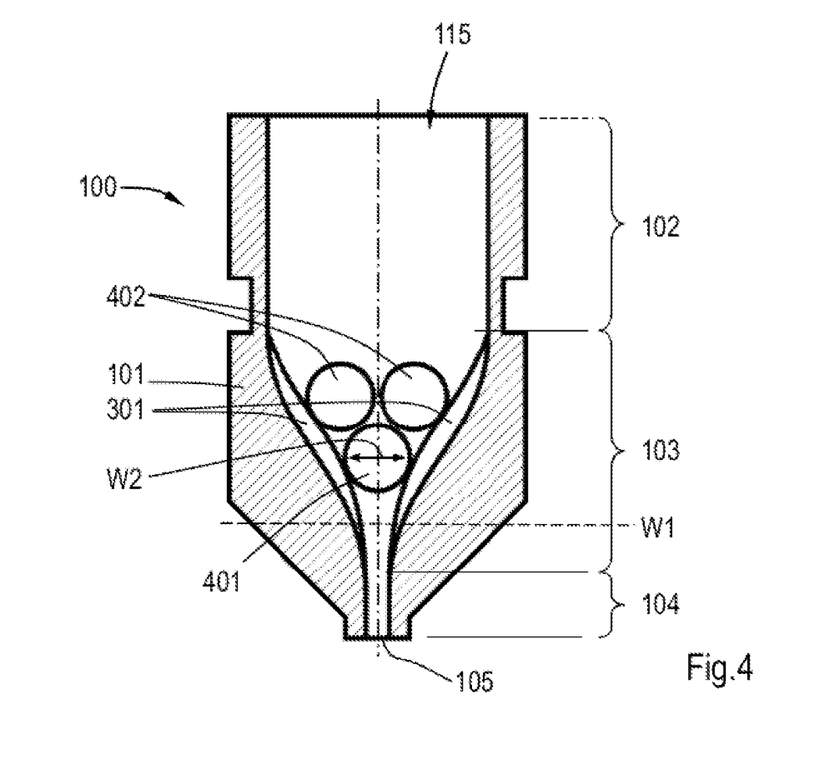
FIG. 4 shows a longitudinal cross section view of a liquefier tube according to a further embodiment of the liquefier tube of FIG. 3a, and FIG. 5 shows stages A-E of a method of manufacturing a liquefier tube according to an embodiment of the invention.

The liquefier tube 100 in the example of FIG. 4 has distribution elements 401 and 402 arranged between the ribs 301. The distribution element 401 is lowest in longitudinal direction in FIG. 4. It has a diameter W2 which is larger than a distance W1 between the ribs 301 in a direction perpendicular to the central axis, the dot dashed line in FIG. 4 to prevent the distribution element 201 from obstructing the passage to the outlet portion 104 of the feed channel 109. The distribution element 401 causes the molten AM feedstock material within the transitional portion 103 to be guided further to the sides, within the grooves 302 of the transitional portion 103. Thereby further enhancing heat transfer between the liquefier body 101 and the AM feedstock material.

Additional distribution elements 402 can be stacked on top of the distribution element 401 to further enhance the distribution of AM feedstock material in a lateral direction within the transitional portion 103, thereby further improving the heat transfer.

In the example of FIG. 4, the distribution elements 401, 402 are represented as spherical objects. The shape of the distribution elements 401, 402 may however also be non-spherical, such as for example ellipsoidal or cylindrical.

When using non-spherical distribution elements, the shape and size can be chosen such that the distribution elements do not block the flow and that they remain in place. The size can for example be chosen such that it is larger than the passage size of the transitional portion 103 of the feed channel defined by the ribs 301.

Moreover, the distribution elements can also be employed together with the non-ribbed embodiment of the transitional portion 103 as shown in FIGS. 1 and 2 wherein the distribution elements may have a shape which allows support in the transitional portion 103 of the feed channel 115 while ensuring passage of the AM feedstock material. Ultimately a single distribution element can for example be shaped to fill up the transitional portion 103 of the feed channel 115 except for one or more grooves in the distribution element surface that allow flow of the molten AM feedstock material 110 from the transitional portion 103 to the outlet portion 104 of the feed channel 115, which grooves can be smoothed and optimized to prevent dead spots in the flow.

Figure 5:
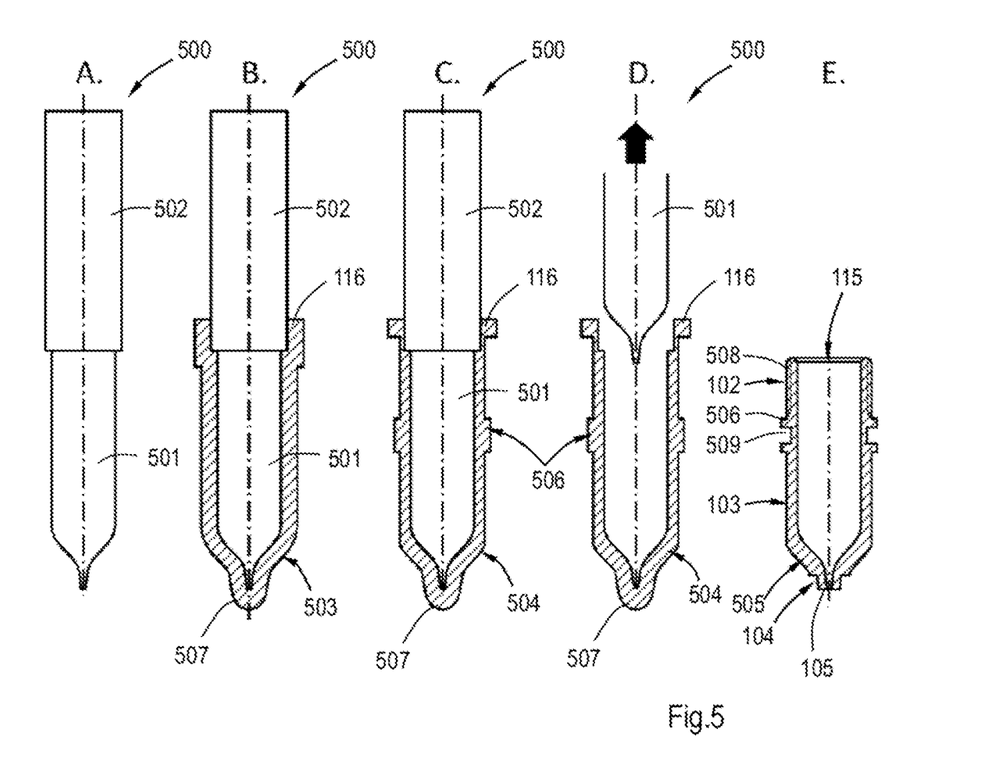

In FIG. 5 stages A-E of a preferred method of manufacturing the liquefier tube is shown.

In stage A, a mandrel 500 is provided. The mandrel 500 in this example is provided with a liquefier forming section 501. The mandrel 500 is shown having a stem 502 connected to the liquefier forming section 501 for fastening the mandrel 500 to for example a support (not shown).

The liquefier forming section 501 has an outer profile which closely corresponds to the inner profile of the feed channel 115, including the feeding portion 102, transitional portion 103 and outlet portion 104 of the liquefier tube 100 as described above.

Optionally, the outer profile of the liquefier forming section 501 can be provided with a slight draft angle to facilitate removal of the liquefier tube from the liquefier forming section 501 after manufacturing using the mandrel 500. The outer surface of the liquefier forming section 501 has a roughness Ra low enough to be suitable for the liquefier tube, i.e. feed channel inner surface, to ensure low residence time of AM feedstock material when the liquefier tube is in use. The roughness Ra may be less than 3.2 µm, preferably less than 0.4 µm more preferably less than 0.1 µm, to be able to manufacture the liquefier unit with a corresponding roughness of the inner surface of the feed channel 115.

The liquefier forming section 501 can be made from electrically conductive material such as a metal. Alternatively, the liquefier forming section 501 has an electrically conductive surface. The latter can be achieved by for example applying a graphite layer on the liquefier forming section 501, or by applying a metal to the liquefier forming section 501 surface.

In stage B, as shown in FIG. 5, a liquefier tube primitive 503 is electroformed around the liquefier forming section 501. The electroforming is performed electrochemically using electrolysis or electroplating. A metal such as nickel is electrochemically deposited on the liquefier forming section 501 outer surface. The electroforming is performed on a highly fine crystalline level to ensure smooth growth of the metal to form the liquefier tube primitive 503 and to provide a smooth inner surface of the feed channel of the liquefier tube primitive 503.

The liquefier tube primitive 503 is not yet fully functional as liquefier tube as described above. It may have a tip 507 for example where an orifice for dispensing molten AM feedstock material is expected. The outer surface of the electroformed liquefier tube primitive 503 may be rough and inaccurate.

In stage C, as shown in FIG. 5, optionally machining of the outer surface of the liquefier tube primitive 503 may be performed such as turning, to obtain an outer profile adapted for fitting in heating system for example to obtain a machined liquefier tube primitive 504. Various structures such as a thickening 506 and optional rim 116 may be formed using the machining method.

In stage D, as shown in FIG. 5, the mandrel 500, i.e. the liquefier forming section 501 is retracted from the machined liquefier tube primitive 504.

In stage E, as shown in FIG. 5, the machined liquefier tube primitive 504 may be further machined into a finished liquefier tube 505 to form other structures such as for example a circumferential groove 509, corresponding to the thermal barrier 108 in FIG. 1, or a screw thread 508 around the liquefier tube outer surface corresponding to feeding portion 102 for mounting the finished liquefier tube 505 into a printhead of an AM apparatus. The tip 507 may be removed for example by grinding to expose the orifice 105. The outer portion of the finished liquefier tube 505 corresponding to the outlet portion may be machined to form for example surfaces having a wrench size for easy mounting in an AM printhead.

As an alternative to electroforming the liquefier tube using the mandrel, the liquefier tube may also be manufactured using subtractive techniques such as electrochemically machining (ECM) and electrically discharge machining (EDM). In these techniques a machining tool is used to remove metal from the inside of a liquefier body to form the feed channel. A proper machining tool is used having an outer profile corresponding to the profile of the inner surface of the feed channel of the liquefier tube. The machining tool can be made from a conductive material such as a metal or a non-conductive material having a metal outer layer to ensure that the outer surface of the machining tool is electrically conductive.

In electrochemical machining, the metal of the liquefier tube body is removed using electrolysis. The machining tool is brought into proximity of the liquefier tube body and progressively liquefier tube material is electrochemically removed, until the shape of the thus formed feed channel corresponds to the shape of the machining tool.

In electrical discharge machining electrically charged particles are discharged from the tool which are transferred electrostatically to the liquefier body, where on impact, particles of the liquefier tube body are released from its inner surface and gradually shape in accordance with an outer shape of the machining tool. The machining tool in this case is brought into proximity of the liquefier tube body and progressively liquefier tube material is removed using the impact of the charged particles until the shape of the thus formed feed channel corresponds to the shape of the machining tool.

It will be clear to a person skilled in the art that the scope of the present invention is not limited to the examples discussed in the foregoing but that several amendments and modifications thereof are possible without deviating from the scope of the present invention as defined by the attached claims. While the present invention has been illustrated and described in detail in the figures and the description, such illustration and description are to be considered illustrative or exemplary only, and not restrictive.

The present invention is not limited to the disclosed embodiments. Wherever cross sections are not limited to round shapes, the term 'diameter' can be interpreted as 'average diameter'. Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference numerals in the claims should not be construed as limiting the scope of the present invention.

| REFERENCE NUMERALS | |
|---|---|
| 100 | Liquefier tube |
| 101 | Liquefier body |
| 102 | Feeding portion |
| 103 | Transitional portion |
| 104 | Outlet portion |
| 105 | Orifice |
| 106 | First transition |
| 107 | Second transition |
| 108 | Thermal barrier |
| 109 | Solid feedstock material |
| 110 | Molten feedstock material |
| 111 | Phase transition |
| 112 | Deposited track |
| 113 | Object to be printed |
| 114 | Extension |
| 115 | Feed channel |
| 116 | Rim |
| 201 | Cone shaped section |
| 301 | Rib |
| 302 | Groove |
| 401, 402 | Distribution element |
| 500 | Mandrel |
| 501 | Liquefier forming section |
| 502 | Stem |
| 503 | Liquefier tube primitive |
| 504 | Machined liquefier tube primitive |
| 505 | Finished liquefier tube |
| 506 | Thickening |
| 507 | Tip |
| 508 | Screw thread |
| 509 | Groove |

The invention claimed is:

1. A method of manufacturing a liquefier tube, comprising:
   a. a body provided with a feed channel;
   b. said feed channel having:
      i. a feeding portion having a first diameter;
      ii. an outlet portion having a second diameter, wherein the first diameter is larger than the second diameter;
      iii. a transitional portion interconnecting the feeding portion and the outlet portion;
   wherein said transitional portion has a monotonically decreasing third diameter from said feeding portion to said outlet portion; and
   wherein said third diameter, as a function of a longitudinal position of said feed channel, is differentiable in said transitional portion and at a first transition between said transitional portion and said outlet portion; and wherein said feed channel has an inner surface with a roughness (Ra) of less than 3.2 μm, the method comprising the steps of:
a. providing a mandrel having an outer surface that is provided with an outer profile that is complementary to an inner profile of said feed channel of said liquefier tube and wherein said outer surface is electrically conductive;
b. depositing a metal layer on said electrically conducting outer surface for forming said liquefier tube using electroforming;
c. removing said liquefier tube from the mandrel.

2. The method of manufacturing a liquefier tube, comprising:
a. a body provided with a feed channel;
b. said feed channel having:
  i. a feeding portion having a first diameter;
  ii. an outlet portion having a second diameter, wherein the first diameter is larger than the second diameter;
  iii. a transitional portion interconnecting the feeding portion and the outlet portion;
wherein said transitional portion has a monotonically decreasing third diameter from said feeding portion to said outlet portion; and
wherein said third diameter, as a function of a longitudinal position of said feed channel, is differentiable in said transitional portion and at a first transition between said transitional portion and said outlet portion; and wherein said feed channel has an inner surface with a roughness (Ra) of less than 3.2 urn,
the method comprising the steps of:
a. providing a machining tool having an outer surface profile complementary to an inner surface profile of said feed channel of said liquefier tube, and wherein said outer surface is electrically conductive;
b. providing a metal body for accommodating said feed channel of said liquefier tube;
c. performing at least ne of electrochemically machining (ECM) and electrically discharge machining (EDM) on said metal body to form said feed channel within said metal body using said machining tool.

3. A liquefier tube for an additive manufacturing (AM) system, comprising:
a. a body provided with a single feed channel;
b. said feed channel having:
  i. a feeding portion having a first diameter;
  ii. an outlet portion having a second diameter, wherein the first diameter is larger than the second diameter;
  iii. a transitional portion interconnecting the feeding portion and the outlet portion;
wherein said transitional portion has a monotonically decreasing third diameter from said feeding portion to said outlet portion; and
wherein said third diameter, as a function of a longitudinal position of said feed channel, is differentiable in said transitional portion and at a first transition between said transitional portion and said outlet portion; and wherein said feed channel has an inner surface with a roughness (Ra) of less than 0.4 μm.

4. The liquefier tube according to claim 3, wherein said transitional portion has a cone shaped section connected to said feeding portion at a second transition between said feeding portion and said transitional portion.

5. The liquefier tube according to claim 3, wherein said third diameter as a function of a longitudinal position of said feed channel in said transitional portion is differentiable at a second transition between said feeding portion and said transitional portion.

6. The liquefier tube according to claim 5, wherein said third diameter as a function of the longitudinal position of said feed channel in said transitional portion has an S-shaped profile.

7. The liquefier tube according to claim 4, wherein said body comprises a thermal barrier at said second transition between said feeding portion and said transitional portion.

8. The liquefier tube according to claim 3, wherein at least one of said feeding portion and said outlet portion has a circular cross section.

9. The liquefier tube according to claim 3, wherein an inner surface of said transitional portion is provided with a plurality of ribs.

10. The liquefier tube according to claim 9, wherein the ribs of said plurality of ribs are arranged at least partially longitudinally in a first section of said transitional portion and/or at least partially spirally in a second section of said transitional portion.

11. The liquefier tube according to claim 9, wherein the ribs of said plurality of ribs have a differentiable cross-sectional profile.

12. The liquefier tube according to claim 9, wherein the ribs of said plurality of ribs have a differentiable profile as a function of a longitudinal position within the feed channel.

13. The liquefier tube according to claim 9, wherein the ribs of said plurality of ribs are spaced evenly along a circumference of said inner surface of said transitional portion.

14. The liquefier tube according to claim 3, wherein said transitional portion is provided with at least one distribution element that is supported at a supporting location.

15. The liquefier tube according to claim 14, wherein said at least one distribution element comprises a heat conductive material.

16. The liquefier tube according to claim 6, wherein said body comprises a thermal barrier at said second transition between said feeding portion and said transitional portion, and wherein at least one of said feeding portion and said outlet portion has a circular cross section.

17. The liquefier tube according to claim 16, wherein an inner surface of said transitional portion is provided with a plurality of ribs, and wherein the ribs of said plurality of ribs are arranged at least partially longitudinally in a first section of said transitional portion and/or at least partially spirally in a second section of said transitional portion.

18. The liquefier tube according to claim 17, wherein the ribs of said plurality of ribs have a differentiable profile as a function of a longitudinal position within the feed channel, wherein the ribs of said plurality of ribs are spaced evenly along a circumference of said inner surface of said transitional portion, and wherein said transitional portion is provided with at least one distribution element that is supported at a supporting location.

19. A method of manufacturing a liquefier tube according to claim 17, comprising the steps of:
a. providing a mandrel having an outer surface that is provided with an outer profile that is complementary to an inner profile of said feed channel of said liquefier tube and wherein said outer surface is electrically conductive;
b. depositing a metal layer on said electrically conducting outer surface for forming said liquefier tube using electroforming;
c. removing said liquefier tube from the mandrel.

20. A method of manufacturing a liquefier tube according to claim 17, comprising the steps of:

a. providing a machining tool having an outer surface profile complementary to an inner surface profile of said feed channel of said liquefier tube, and wherein said outer surface is electrically conductive;
b. providing a metal body for accommodating said feed channel of said liquefier tube;
c. performing at least one of electrochemically machining (ECM) and electrically discharge machining (EDM) on said metal body to form said feed channel within said metal body using said machining tool.

21. The liquefier tube according to claim 3, wherein said feed channel inner surface roughness (Ra) is less than 0.1 μm.

* * * * *